Aug. 22, 1967  H. E. DYKEMAN  3,337,025
BUCKET CONVEYOR

Filed Feb. 11, 1966

INVENTOR.
HOWARD E. DYKEMAN
BY
his ATTORNEYS

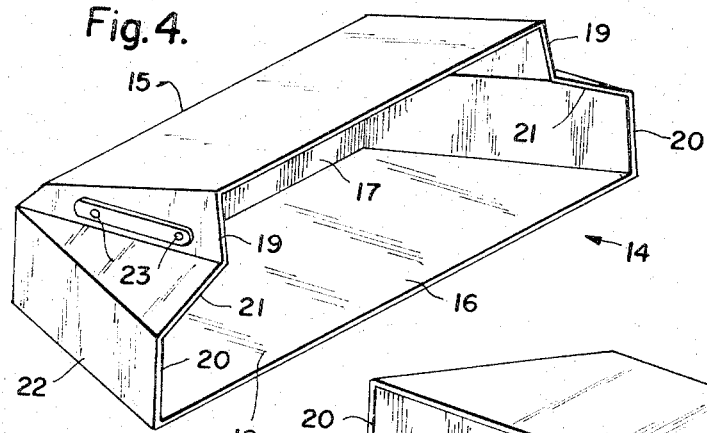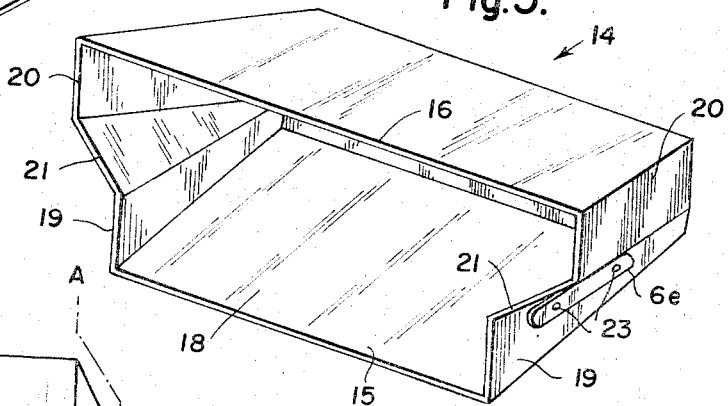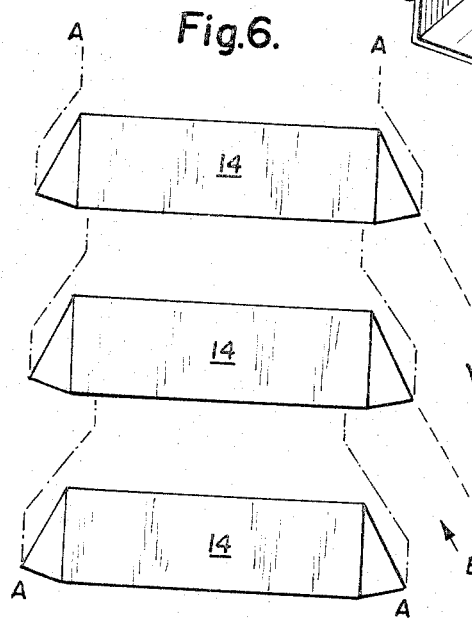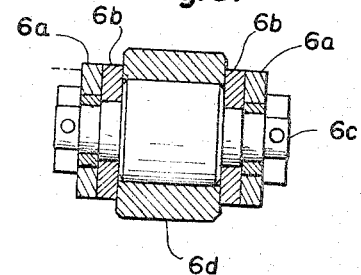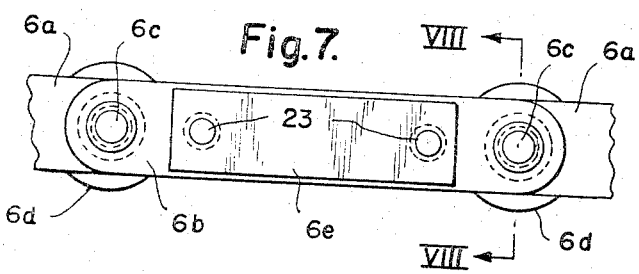

United States Patent Office 3,337,025
Patented Aug. 22, 1967

3,337,025
BUCKET CONVEYOR
Howard E. Dykeman, Pittsburgh, Pa., assignor to Dravo Corporation, Pittsburgh, Pa., a corporation of Pennsylvania
Filed Feb. 11, 1966, Ser. No. 526,779
7 Claims. (Cl. 198—152)

This invention is for an improvement in conveyors of the type commonly referred to as bucket or ladder conveyors, and to an improved bucket for use therewith.

In the usual form of bucket or ladder conveyors there are parallel endless carriers, which may be belts, but which usually are sprocket chains that are spaced apart the width of the conveyor and elongated scoop-like buckets extend crosswise between the two chains at regular spaced intervals. The chains pass over sprockets at the top of the conveyor and at the bottom, and the sprockets are driven in a direction to move the buckets so that material is scooped into them at the lower end of the conveyor, elevated with the buckets upright, inverted as the chains pass around the upper sprockets so that the buckets discharge their contents and descend in an inverted position. For many purposes, as for example the unloading of bulk material from barges, the chains are guided in such manner as to form a loop at the bottom, known in the art as a "bag" where the buckets travel substantially horizontally along the barge floor before passing around the lower sprocket.

The present invention is designed especially for use in unloading barges loaded with coal or sand or like bulk material, or in other locations where the conveyor must clear up material from the floor and work close to side walls, or where in the digging operation there is a relative sidewise travel of the conveyor in respect to the material, as where the conveyor is caused to reciprocate crosswise of a barge which is being unloaded while the barge may also be moving lengthwise under the unloader. In this respect the present invention is particularly useful for a split conveyor unloader.

According to this invention, a conveyor of this type is provided with an outer face plate and an inner plate, the inner plate being the one that is inside the path of travel of the chains on which the buckets are carried, and the outer one being the one outside the chains, and the free edge of which is the digging edge of the bucket. The bucket has an open gathering end, a bottom and side walls. The outer plate is wider at the open end than at the inner one, but the same width as the inner one at the bottom, and the side walls are provided with an offset, in such manner that the side walls between the offset and the inner plate are substantially parallel, while the portions between the offset and the out plate flare outwardly from the bottom toward the open end. These flared portions thereby extend beyond the chains at the respective sides of the buckets, and the effective width of the bucket exceeds the width between the chains. This is of advantage in keeping most of the material clear of the chains, and has later proved to be of especial advantage in installations where so-called inside dumping is used in contrast to the more common practice of throwing the material by centrifugal force as the buckets pass over the sprockets.

The invention has for its principal object to provide a ladder type or bucket conveyor in which effective portions of the bucket extend beyond the chains, but the material is discharged therefrom mainly between the chains and their sprocket wheels.

A further object is to provide a bucket conveyor that will effectively remove material from a heap when it is thrust sideways against the heap while also moving forward into the heap, as well as when it is moving directly forward into the material.

A still further object is to provide a bucket conveyor which is more effective for gathering bulk material close against the sides of a barge or from the toe of a heap than conventional buckets.

These and other objects and advantages will appear from the following detailed description in conjunction with the accompanying drawings, in which:

FIG. 3 is a transverse section in the plane of line III—III of FIG. 1;

FIG. 4 is a perspective view of one of the buckets shown in the position which it assumes in moving horizontally along the floor of a barge;

FIG. 5 is a similar view showing the bucket in the dumping position;

FIG. 6 is a schematic view indicating the operation of a series of buckets in connection with a pile of material;

FIG. 7 is a detail view of a portion of one of the bucket chains;

FIG. 8 is a transverse section in the plane of line VIII—VIII of FIG. 7; and

Figure 1:
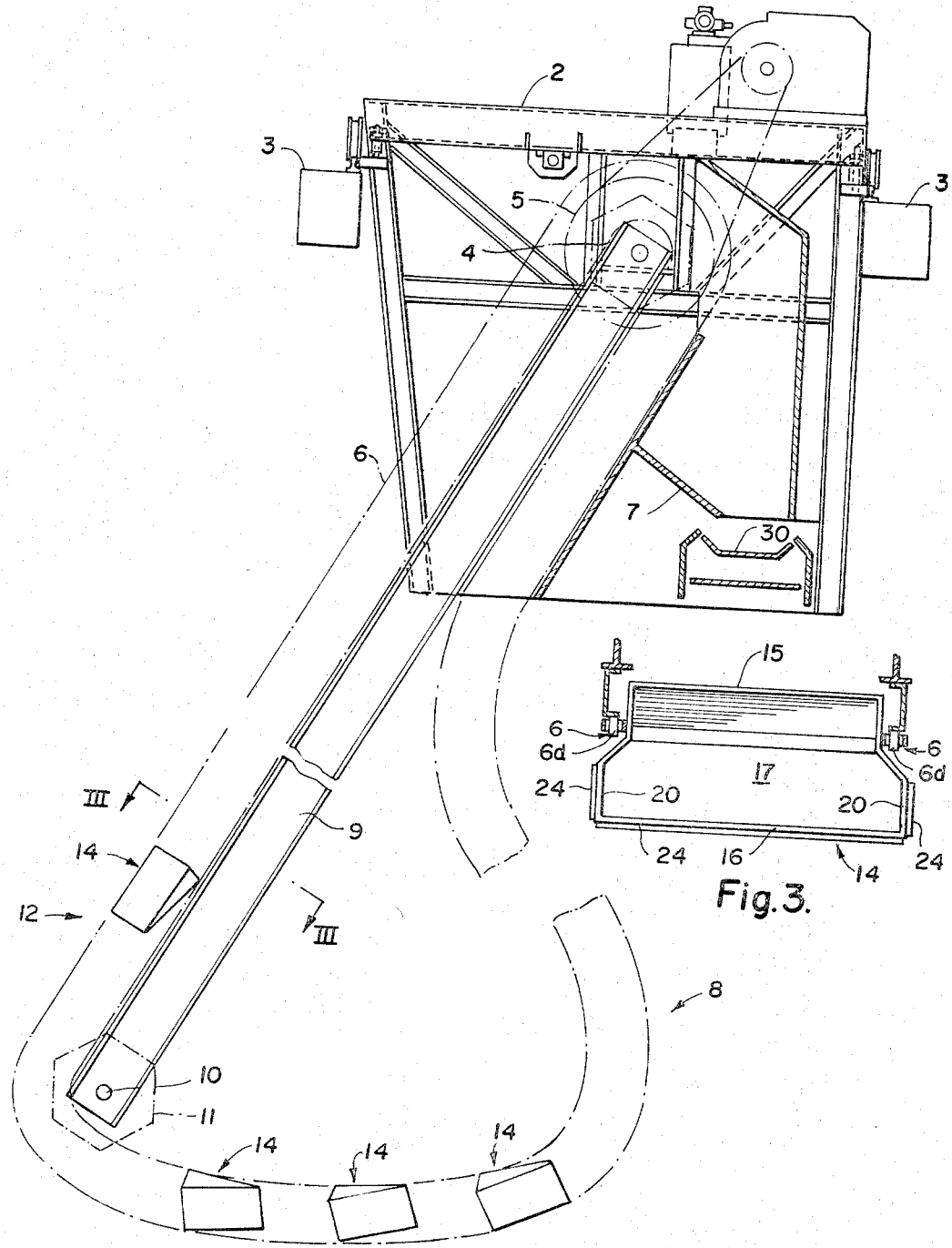
FIG. 1 is a side elevation showing the general arrangement of the conveyor with the path of travel of the conveyor buckets being indicated by broken lines.
Figure 2:
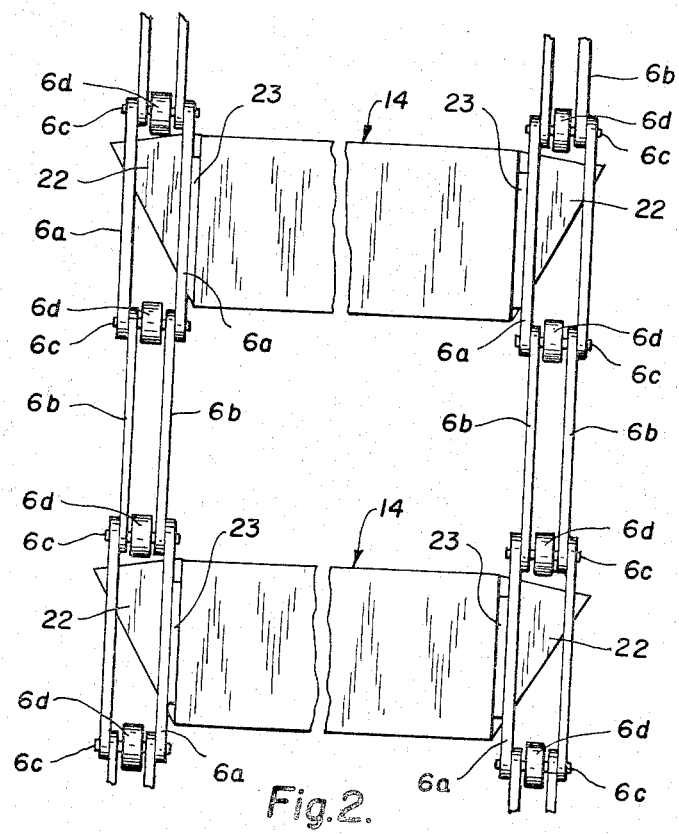
FIG. 2 is a fragmentary elevation looking from the inside or rear of the conveyor outwardly.

In the drawings I have illustrated an embodiment of the bucket or ladder conveyor which depends from an overhead carriage 2 which is movable across a vertically-adjustable frame 3, as disclosed more fully in my said copending application with W. L. Price, above referred to. This construction provides an upper driven sprocket shaft 4 having two sprocket wheels 5 thereon which are spaced apart. Two continuous chains 6 are provided, one passing around each sprocket wheel. The chains in this particular arrangement move in a descending path or reach, being guided in the upper part of the reach by a receiving hopper or chute structure 7, and below this hopper the chains are freely suspended. They form a wide loop or bag 8 at the bottom. There is a rigid structural supporting frame 9 that extends well down toward the bottom of the loop and it carries a lower sprocket shaft 10 with spaced sprocket wheels 11 thereon about which the chains travel into the ascending reach 12 of the conveyor.

The endless carrier for the buckets, so illustrated by the two chains 6, are of conventional construction, having outside links 6a, inside links 6b, pivots 6c, these pivots including roller 6d. These rollers move on rails 13 on the frame 9. The outside links 6a have filler strips 6e secured to the chains.

The buckets, designated generally as 14, are of the general shape best shown in FIGS. 4 and 5, the former showing the attitude of the bucket when it is moving in a generally horizontal direction along the bottom of the bag, and the other figure showing the attitude of the bucket when it is passing over the upper sprocket wheels and discharging its contents. As shown in these figures, each bucket has an inner plate 15, an outer plate 16, and a bottom or closure plate 17. The bucket has an open entrance or top 18. The inner and outer plates diverge from the closure or bottom plate 17 toward the open end 18. The outer plate 16 is wider than the inner plate 15 at the entrance end, but the two plates are the same width at the closed end or bottom of the bucket. There are opposed end walls comprising vertical wall portions 19 that are perpendicular to the inner plate to which they join, the portions 19 at opposite ends of the bucket being parallel and parallel with the chains, and what may be termed the transverse axis of the bucket. These portions are of decreasing width toward the closed end of the bucket. The side walls also comprise a portion 20 generally perpendicular to the outer plate to which they are joined, these portions at opposite sides of the bucket diverging from the closed end toward the open end. Connecting the portions 19 and 20 is an offset connecting ledge portion 21 which, in the position shown in FIG. 4, slopes upwardly from the side portions 20 to the side portions 19, but when the bucket is inverted to the position shown in FIG. 5 this is a down slope. This offset portion 21 is widest at the open end of the bucket and tapers to a very narrow ledge at the closed end of the bucket.

By reason of this formation, a bucket is provided which is widest at the open end and tapers toward its closed end. Also, its side walls provide an outwardly-angled scoop-like portion or extension 22 at each end of the bucket that projects beyond the chains and a parallel-sided portion which is formed by the wall portions 19, 20 and these parallel-sided portions are positioned between the chains. There is a sloping offset portion in each end wall of decreasing width toward the closed end of the bucket.

The inner plate 15 with its parallel side wall portion 19 is of a width such that it is disposed between the chains 6 while the maximum width of the outer plate 16 and the flared side wall portion 20 project beyond the chains. As here shown, the chains are attached to the parallel side wall portions by bolts positioned at 23 that are threaded into the filler strips 6e, there being two such bolts at each side of each bucket. Lip bars or wear strips 24 are shown around the leading edges of the plate 16 and the side wall portions.

As thus constructed, the buckets, when they are in an upright position, have ends which flare upwardly from the closed bottom to the open top, and which flare outwardly from the inner plate to the outer one, and the bucket space between the plates is greater from the front plate to the back at the top than at the bottom.

In use, assuming that the conveyor is unloading a barge carrying bulk material, such for example as coal, the condition diagrammed in FIG. 6 illustrates one advantage of this arrangement. As the lead bucket in the series digs into the pile of material, it removes a certain section of material, but as it moves on, the coal seeks a new angle of repose, and the toe of the pile moves in, and in so doing it enters between the leading bucket and the next one, and this repeats between the second and third buckets. In FIG. 6 the dot-and-dash line A—A is intended to indicate the general "toe" line of the material. Because of the rearwardly-decreasing width of each bucket there is in effect a diagonal throat B leading into each bucket that enables large lumps in the toe of the pile to be gathered. In other words, the leading corner of a following bucket is diagonally spaced from the trailing corner of the bucket immediately ahead, thereby enabling material at the toe of the pile, aspecially large lumps, to more freely enter the trailing bucket than is the case where the usual square-ended buckets are provided. This arrangement is particularly important when the barge has been partly unloaded and the conveyor is working along the floor of the barge with material at each side. Also because the outer portions of the buckets extend beyond the chains, the buckets may work close against the side walls of the barge. In some operations the conveyor is urged sideways into the material as it also moves forwardly into the material, and these buckets are effective in digging sideways into the pile whereas, with buckets having flat sides, considerable difficulty may be encountered in effecting digging where there is a sidewise component of movement.

When the buckets of this invention move over the top sprockets to dump their loads, the load of material in each bucket slides off the inner plate 15 and the material in the flared portion slides on the sloping offset portions into the area over this plate 15. As a result, little of the material in the buckets discharges onto the sprockets or the chains. As above indicated, a later-discovered advantage is the adaptability of the bucket to elevating material where the material falls between the chains in inside dumping instead of being thrown from the buckets as the buckets pass around the top sprocket. In inside dumping the material is dumped down through a reach of the chains between two upper sprockets, with the receiving hopper located between the upward and downward reaches of the chains.

In the drawings there is disclosed a belt conveyor 30 that receives the material from the hopper 7, but various arrangements may be provided for carrying the material away from the receiving hopper.

Figure 9:
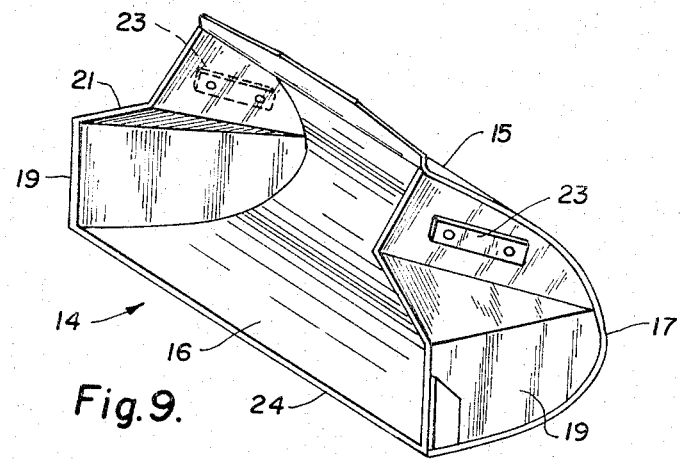
FIG. 9 is a perspective view showing my invention adapted to a scoop-like bucket.

In FIG. 9, the invention is adapted to a more scoop-like shape of bucket which is more effective for digging than the shape first described, but insofar as this invention is concerned, is otherwise no different. Corresponding reference numerals indicate the corresponding parts.

While I have shown and described one specfic embodiment of my invention, it will be understood that various modifications and changes may be made within the contemplation of my invention and under the scope of the following claims.

I claim:

1. A bucket for a bucket type conveyor designed to be carried by an endless flexible carrier, said bucket in an upright position having spaced inner and outer face plates, a bottom and an open top and end walls at each end, the outer face plate being wider than the inner one at the top edges and being the same width as the inner one at the bottom, the end walls being joined to the edges of said plates whereby the ends of the bucket flare outwardly from the bottom to the open top and from the inner plate to the outer one.

2. A bucket for a bucket conveyor as defined in claim 1 in which the end walls of the bucket each have a wall portion joined to the edge of the inner plate that is parallel with a corresponding portion of the end wall at the other end of the bucket and another portion joined to the edge of the outer plate and in a plane which is at an angle to the first defined portion, and a ledge portion joining said first and which is angularly disposed with respect to the planes of said first two portions.

3. A bucket for a bucket conveyor as defined in claim 1 in which the end walls of the bucket each have a wall portion joined to the edge of the inner plate that is parallel with a corresponding portion of the end wall at the other end of the bucket and another portion joined to the edge of the outer plate and in a plane which is at an angle to the first defined portion, and a ledge portion joining said first and which is angularly disposed with respect to the planes of said first two portions, said inner and outer face plates diverging from the bottom to the top.

4. A bucket for a bucket conveyor as defined in claim 1 in which the end walls of the bucket each have a wall portion joined to the edge of the inner plate that is parallel with a corresponding portion of the end wall at the other end of the bucket and another portion joined to the edge of the outer plate and in a plane which is at an angle to the first defined portion, and a ledge portion joining said first and which is angularly disposed with respect to the planes of said first two portions, each of said first-named parallel end wall portions having means outside the bucket for connecting the bucket to an endless sprocket chain, which chains comprise an endless flexible carrier whereby a portion of said buckets will be disposed between chains secured to end wall portions and portions of the end walls are wider than the distance between the chains when they are so attached.

5. A bucket conveyor comprising an endless carrier looped around vertically-spaced wheels, means for driving the carrier and wheels, and a plurality of spaced buckets on the carrier, each bucket having an inner plate portion and an outer plate portion spaced from the inner one, each bucket in an upright position having an open top and a closed bottom, the outer plate being wider at the top than the inner one and being wider at the top than at the bottom, and an end plate at each end of the bucket connecting the outer and inner plates, the bucket thereby having ends which flare outwardly from the bottom to the top when the bucket is upright and with end plates further apart where they join the outer plate than where they join the inner plate.

6. A bucket conveyor comprising a pair of spaced sprocket chains and upper and lower sprocket wheels about which the chains are looped, and a plurality of spaced buckets on the chains, each bucket having an inner portion located between the chains and an outer portion wider than the distance between the chains, the bucket having end walls with an offset ledge portion between the said inner and outer portions.

7. A bucket conveyor as defined in claim 6 wherein the said end walls of the outer portion form scoop-like extensions on the bucket ends.

References Cited

UNITED STATES PATENTS 1,084,662   1/1914   Porter _____ 198—152

EVON C. BLUNK, *Primary Examiner.*

A. C. HODGSON, *Assistant Examiner.*